US011942714B2

(12) United States Patent
Hashiguchi

(10) Patent No.: US 11,942,714 B2
(45) Date of Patent: Mar. 26, 2024

(54) SOCKET CONTACT AND CONNECTOR

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 17/832,125

(22) Filed: Jun. 3, 2022

(65) Prior Publication Data

US 2022/0302621 A1 Sep. 22, 2022

Related U.S. Application Data

(62) Division of application No. 16/918,417, filed on Jul. 1, 2020, now Pat. No. 11,381,021.

(30) Foreign Application Priority Data

Oct. 7, 2019 (JP) ................................ 2019-184700

(51) Int. Cl.
*H01R 13/18* (2006.01)
*H01R 13/11* (2006.01)
(Continued)

(52) U.S. Cl.
CPC ........... *H01R 13/18* (2013.01); *H01R 13/111* (2013.01); *H01R 13/187* (2013.01); *H01R 24/76* (2013.01)

(58) Field of Classification Search
CPC .... H01R 13/193; H01R 13/18; H01R 13/111; H01R 13/187; H01R 24/76
See application file for complete search history.

(56) References Cited

U.S. PATENT DOCUMENTS 2,105,884 A * 1/1938 Hanser .................. H01R 13/18 439/752
2,391,425 A * 12/1945 Korn .................... H01R 13/187 439/843

(Continued)

FOREIGN PATENT DOCUMENTS

JP 2011-49086 A 3/2011
JP 2013-247007 A 12/2013

OTHER PUBLICATIONS

First Office Action issued by the Japanese Patent Office for corresponding Japanese patent application No. 2019-184700, dated Mar. 14, 2023, together with an English translation.

*Primary Examiner* — Thanh Tam T Le
(74) *Attorney, Agent, or Firm* — GREENBLUM & BERNSTEIN, P.L.C.

(57) ABSTRACT

A socket contact includes a cylindrical sleeve, a plurality of cantilever-shaped spring pieces arranged in rotational symmetry with respect to the central line of the sleeve as a symmetric axis, and a base portion to which fixed ends of the plurality of spring pieces are fixed. The sleeve is movably mounted to the base portion, the plurality of spring pieces has bent portions between free ends and the fixed ends, the plurality of spring pieces is elastically deformed so that the free ends come close to each other when the sleeve is moved and covers the free ends, and a pin contact inserted among the plurality of spring pieces is sandwiched by the bent portions of the plurality of spring pieces elastically deformed by the moved sleeve, electrically connected, and held.

4 Claims, 15 Drawing Sheets

(51) Int. Cl.
*H01R 13/187* (2006.01)
*H01R 24/76* (2011.01)

(56) References Cited

U.S. PATENT DOCUMENTS

| | | | | | |
|---|---|---|---|---|---|
| 2,436,914 | A | * | 3/1948 | Breisch | H01R 24/66 439/739 |
| 2,549,577 | A | * | 4/1951 | Coyle | H01R 24/20 439/843 |
| 3,221,293 | A | * | 11/1965 | Regan | H01R 4/4809 439/787 |
| 3,519,799 | A | | 7/1970 | Bange | |
| 3,678,261 | A | * | 7/1972 | McNeil | F21V 17/164 248/27.3 |
| 3,718,895 | A | * | 2/1973 | Reynolds | H01R 12/728 439/876 |
| 3,805,116 | A | * | 4/1974 | Nehmann | H05K 7/10 361/809 |
| 4,002,400 | A | | 1/1977 | Evans | |
| 4,012,107 | A | * | 3/1977 | Cobaugh | H01R 13/111 439/82 |
| 4,472,017 | A | * | 9/1984 | Sian | H01R 13/115 439/747 |
| 4,505,531 | A | * | 3/1985 | Miller | H01R 13/187 439/246 |
| 4,525,023 | A | * | 6/1985 | Lawson | H01R 13/187 439/861 |
| 4,540,235 | A | | 9/1985 | Lolic | |
| 4,838,816 | A | * | 6/1989 | Matsusaka | H01R 13/187 439/852 |
| 4,906,203 | A | * | 3/1990 | Margrave | H01R 13/7032 439/188 |
| 4,992,062 | A | * | 2/1991 | Nakayama | H01H 85/2035 439/861 |
| 5,131,853 | A | | 7/1992 | Meyer | |
| 5,162,004 | A | * | 11/1992 | Kuzuno | H01R 13/193 439/867 |
| 5,462,459 | A | * | 10/1995 | Childs | H01R 13/113 439/856 |
| 5,505,631 | A | * | 4/1996 | Schauer | F42C 19/06 200/51.1 |
| 5,516,310 | A | * | 5/1996 | Sawada | H01R 13/187 439/843 |
| 5,573,434 | A | * | 11/1996 | Ittah | H01R 13/113 439/839 |
| 5,658,175 | A | | 8/1997 | Muzslay | |
| 5,667,413 | A | | 9/1997 | Trafton | |
| 5,730,628 | A | * | 3/1998 | Hawkins | A61N 1/3752 439/843 |
| 5,735,716 | A | * | 4/1998 | Bilezikjian | H01R 13/187 439/843 |
| 5,833,500 | A | * | 11/1998 | Mahon | H01R 43/16 439/852 |
| 5,868,590 | A | * | 2/1999 | Dobbelaere | H01R 13/18 439/839 |
| 5,897,404 | A | * | 4/1999 | Goodman | H01R 13/187 439/843 |
| 6,039,584 | A | * | 3/2000 | Ross | H01R 25/14 439/115 |
| 6,042,432 | A | * | 3/2000 | Hashizawa | H01R 13/187 439/843 |
| 6,250,974 | B1 | * | 6/2001 | Kerek | H01R 13/187 439/843 |
| 6,358,071 | B1 | | 3/2002 | Moga | |
| 6,394,829 | B1 | * | 5/2002 | Patterson | H01R 13/6315 439/252 |
| 6,565,396 | B2 | | 5/2003 | Saka | |
| 6,722,926 | B2 | | 4/2004 | Chevassus-Morei | |
| 6,752,668 | B2 | | 6/2004 | Koch, Jr. | |
| 6,902,413 | B1 | * | 6/2005 | Moga | H01R 35/025 439/125 |
| 6,910,925 | B2 | * | 6/2005 | Endo | H01R 13/187 439/856 |
| 7,150,660 | B2 | * | 12/2006 | Allgood | H01R 13/113 439/852 |
| 7,581,972 | B2 | | 9/2009 | Daamen | |
| 7,594,832 | B2 | * | 9/2009 | Oka | H01R 13/03 439/884 |
| 7,766,706 | B2 | * | 8/2010 | Kawamura | H01R 13/113 439/833 |
| 8,333,620 | B2 | | 12/2012 | Komatsu | |
| 8,419,486 | B2 | * | 4/2013 | Tyler | H01R 13/187 439/845 |
| 8,721,190 | B2 | | 5/2014 | Koreeda et al. | |
| 8,944,858 | B2 | | 2/2015 | Schmidt | |
| 8,992,270 | B2 | * | 3/2015 | Glick | H01R 13/187 439/843 |
| 9,176,287 | B2 | | 11/2015 | Koreeda et al. | |
| 9,318,829 | B2 | * | 4/2016 | Yu | H01R 13/18 |
| 9,325,095 | B2 | | 4/2016 | Glick | |
| 9,437,974 | B2 | | 9/2016 | Glick | |
| 9,444,168 | B2 | | 9/2016 | Horiuchi | |
| 9,632,262 | B2 | | 4/2017 | Aihara et al. | |
| 9,716,331 | B2 | | 7/2017 | Sasaki et al. | |
| 9,748,685 | B2 | * | 8/2017 | Oba | H01R 13/115 |
| 10,003,154 | B2 | | 6/2018 | Koreeda et al. | |
| 10,050,395 | B2 | * | 8/2018 | Ngo | H01R 4/023 |
| 10,094,990 | B2 | | 10/2018 | Hashiguchi | |
| 10,164,116 | B2 | * | 12/2018 | Huang | H01L 29/66666 |
| 10,193,247 | B1 | | 1/2019 | Glick | |
| 10,228,523 | B2 | | 3/2019 | Hashiguchi | |
| 10,230,191 | B2 | * | 3/2019 | Lui | H01R 13/187 |
| 10,236,596 | B2 | * | 3/2019 | Hirakawa | H01R 4/184 |
| 10,290,990 | B2 | | 5/2019 | Horiuchi | |
| 10,305,213 | B1 | * | 5/2019 | Hirakawa | H01R 13/187 |
| 10,389,054 | B1 | * | 8/2019 | Neumann | H01R 13/112 |
| 10,389,055 | B1 | * | 8/2019 | Lui | H01R 13/187 |
| 10,756,473 | B2 | * | 8/2020 | Tanaka | H01R 13/42 |
| 10,855,014 | B1 | * | 12/2020 | Wu | H01R 13/187 |
| 11,381,021 | B2 | * | 7/2022 | Hashiguchi | H01R 13/18 |
| 2015/0126076 | A1 | | 5/2015 | Horiuchi et al. | |
| 2020/0287306 | A1 | | 9/2020 | Hashiguchi | |
| 2021/0131997 | A1 | | 5/2021 | Hashiguchi | |
| 2021/0131999 | A1 | | 6/2021 | Hashiguchi | |

* cited by examiner

SOCKET CONTACT AND CONNECTOR

CROSS-REFERENCE TO RELATED APPLICATION

The present application is a divisional application of U.S. patent application Ser. No. 16/918,417, filed Jul. 1, 2020, which claims the benefit of Japanese Patent Application No. 2019-184700, filed Oct. 7, 2019. The disclosure of each of the above-mentioned applications is expressly incorporated herein by reference in its entirety.

TECHNICAL FIELD

The present invention relates to a socket contact to be connected to a counterpart pin contact and a connector having the socket contact.

BACKGROUND ART

FIGS. 1A and 1B illustrate, as a conventional example of a socket contact, the socket contact described in Japanese Patent Application Laid Open No. 2013-247007 (hereinafter referred to as Patent Literature 1) (the socket contact is referred to as the socket terminal in Patent Literature 1). FIG. 2 illustrates the state in which a pin contact (referred to as a pin terminal in Patent Literature 1) is fitted to the socket contact.

A socket contact 10 has a cylindrical portion 11 that can be fitted onto a pin contact 20. The cylindrical portion 11 includes a base portion 12 provided on the opposite side of the front end to be fitted onto the pin contact 20, and a plurality of terminal pieces 13, arranged side by side at intervals in the circumferential direction of the cylindrical portion 11, that extend in the axial direction of the cylindrical portion 11 from the base portion 12 toward the pin contact 20. In addition, the base portion 12 is provided with a plurality of elasticity retaining pieces 14 that project in the radial direction of the cylindrical portion 11 toward the pin contact 20.

When the pin contact 20 is fitted to the socket contact 10, the pin contact 20 is inserted into the cylindrical portion 11 of the socket contact 10 and the plurality of terminal pieces 13 of the socket contact 10 is pressed apart by the pin contact 20. This brings the terminal pieces 13 into elastic contact with the outer peripheral surface of the pin contact 20 and makes an electric connection between the pin contact 20 and the socket contact 10. In addition, the elasticity retaining pieces 14 make contact or elastic contact with the outer peripheral surface of the pin contact 20 and hold the front end portion of the pin contact 20.

SUMMARY OF THE INVENTION

As described above, the conventional socket contact 10 makes an electric connection with the pin contact 20 by bringing the plurality of terminal pieces 13 into elastic contact with the pin contact 20 and holds the pin contact 20 by bringing the plurality of the elasticity retaining pieces 14 into contact or elastic contact with the pin contact 20.

Accordingly, the dimension of the inner diameter surrounded by the plurality of terminal pieces 13 is set smaller than the outer dimension (dimension of the outer diameter) of the pin contact 20 and the dimension of the inner diameter surrounded by the plurality of the elasticity retaining pieces 14 is set smaller than or equal to the dimension of the outer diameter of the pin contact 20.

When a higher contact force or retaining force is obtained to improve connection reliability in the conventional socket contact 10, the dimensions of the inner diameters surrounded by the plurality of terminal pieces 13 and the plurality of elasticity retaining pieces 14 need to be further reduced. Accordingly, when the pin contact 20 is inserted into the socket contact 10, a large force is necessary, thereby degrading connection operability.

The present invention addresses this problem with an object of providing a socket contact capable of connecting to a pin contact easily and obtaining a high contact force and a high retaining force and providing a connector having the socket contact.

The socket contact is connected to a counterpart pin contact. A first socket contact according to the present invention includes a cylindrical sleeve, a plurality of cantilever-shaped spring pieces arranged in rotational symmetry with respect to a central line of the sleeve as a symmetric axis, and a base portion to which fixed ends of the plurality of spring pieces are fixed. The sleeve is movably mounted to the base portion. The plurality of spring pieces has bent portions between free ends and the fixed ends. The plurality of spring pieces is elastically deformed so that the free ends come close to each other when the sleeve is moved and covers the free ends. The pin contact inserted among the plurality of spring pieces is sandwiched by the bent portions of the plurality of spring pieces elastically deformed by the moved sleeve, electrically connected, and held by the socket contact.

A second socket contact according to the present invention includes a cantilever-shaped spring piece, a base portion to which a fixed end of the spring piece is fixed, an opposed portion extended from the base portion and opposed to the spring piece, and a cylindrical sleeve movably mounted to the base portion. The spring piece has a bent portion between a free end and the fixed end. The spring piece is elastically deformed so that the free end comes close to the opposed portion when the sleeve is moved and covers the free end. The pin contact inserted between the spring piece and the opposed portion is sandwiched by the bent portion of the spring piece elastically deformed by the moved sleeve and the opposed portion, electrically connected, and held by the socket contact.

A connector according to the present invention includes the first or second socket contact of the present invention and a housing. The housing holds the socket contact. The housing is provided with a slider that moves in conjunction with the sleeve.

According to the present invention, when the sleeve is moved and covers the free end, the bent portion located between the free end and the fixed end of the elastically deformed spring piece is pushed against the inserted counterpart pin contact. Accordingly, a connection to the pin contact is easy and a high contact force and a high retaining force can be obtained by the principle of a lever.

DETAILED DESCRIPTION OF THE EMBODIMENTS

Embodiments of the present invention will be described using examples with reference to the drawings.

First Embodiment

Figure 1A:
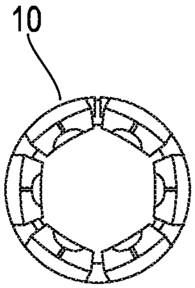
FIG. 1A PRIOR ART
FIG. 1A is a front view illustrating a conventional example of a socket contact.
Figure 1B:
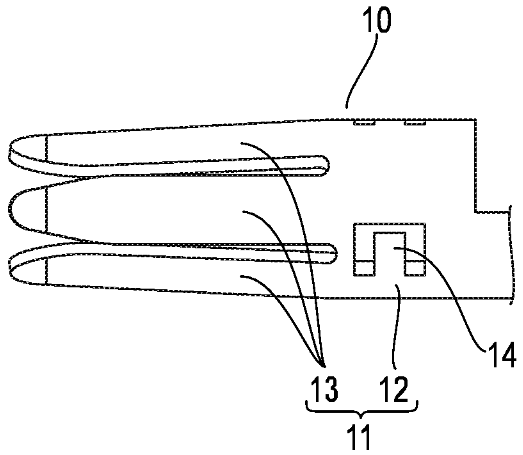
FIG. 1B PRIOR ART
FIG. 1B is a side view illustrating the conventional example of the socket contact.
Figure 2:
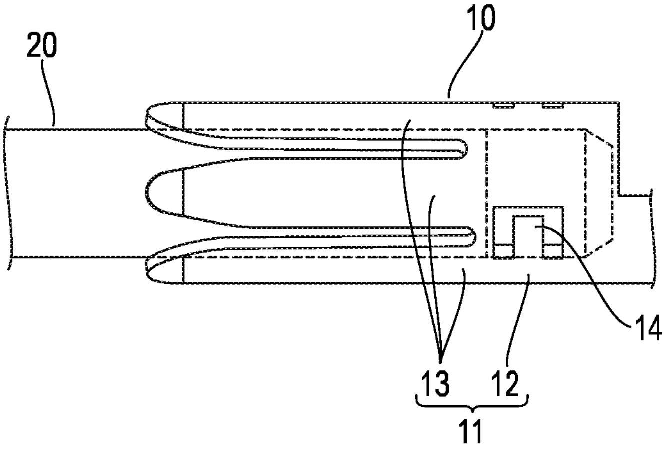
FIG. 2 PRIOR ART
FIG. 2 is a side view illustrating the state in which a pin contact is fitted to the socket contact illustrated in FIGS. 1A and 1B.
Figure 3A:
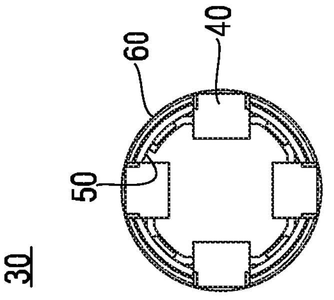
FIG. 3A is a front view illustrating a socket contact according to a first embodiment.
Figure 3B:
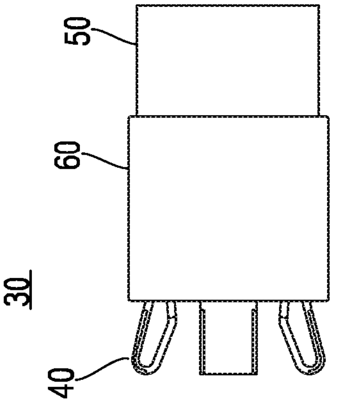
FIG. 3B is a side view illustrating the socket contact according to the first embodiment.
Figure 3C:
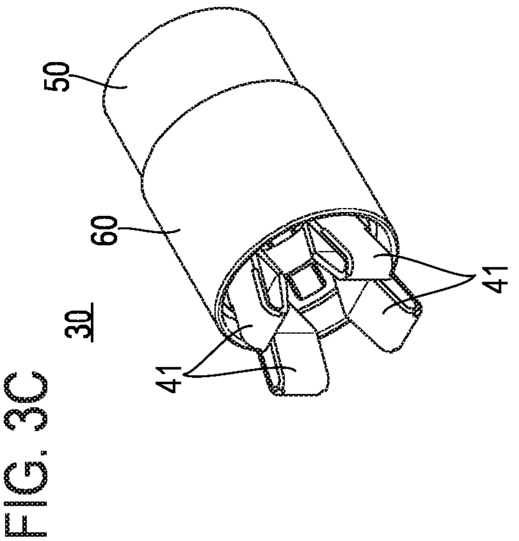
FIG. 3C is a perspective view illustrating the socket contact according to the first embodiment.
Figure 3D:
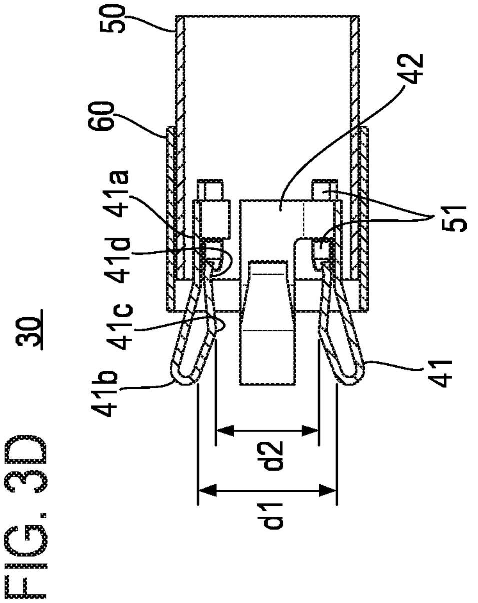
FIG. 3D is a sectional view illustrating the socket contact according to the first embodiment.
Figure 4:
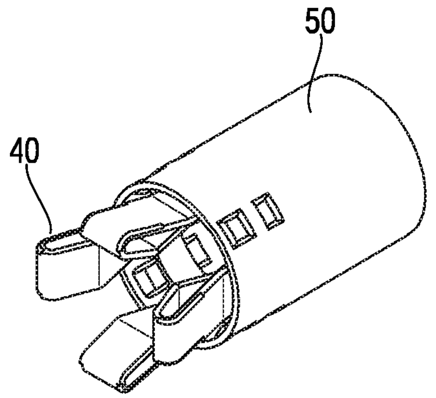
FIG. 4 is a perspective view illustrating the state in which a sleeve has been removed from the socket contact in FIGS. 3A to 3D.
Figure 5A:
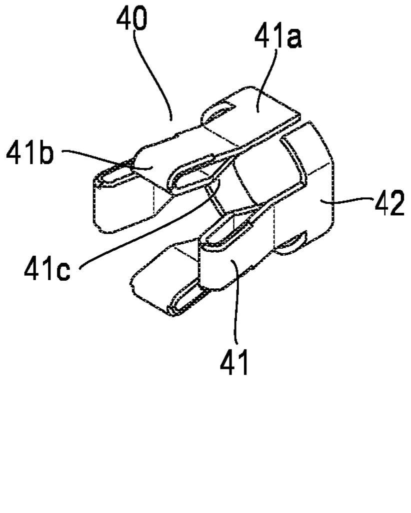
FIG. 5A is a perspective view illustrating a spring component.
Figure 5B:
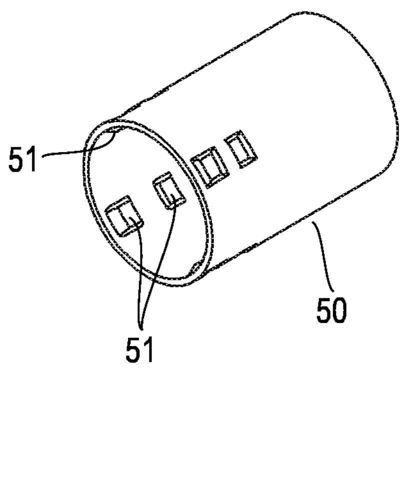
FIG. 5B is a perspective view illustrating a base portion.

FIGS. 3A to 3D illustrate a socket contact according to a first embodiment. FIG. 3A is a front view, FIG. 3B is a side view, FIG. 3C is a perspective view, and FIG. 3D is a sectional view. A socket contact 30 includes a spring component 40, a base portion 50, and a sleeve 60. FIG. 4 illustrates the state in which the sleeve 60 has been removed from the socket contact 30. FIG. 5A illustrates the spring component 40 and FIG. 5B illustrates the base portion 50.

The spring component 40 includes four cantilever-shaped spring pieces 41 and an annular joint portion 42. The four spring pieces 41 are arranged in rotational symmetry with respect to the central line of the annular joint portion 42 as a symmetric axis. In the example in FIG. 5A, the four spring pieces 41 are arranged in fourfold symmetry positions on the circumference at regular angular intervals of 90 degrees. These spring pieces 41 are integrated with each other with one ends (fixed ends) thereof joined to and supported by the joint portion 42.

Each of the spring pieces 41 has a shape that extends from a fixed end 41*a* supported by the joint portion 42 along the central line of the joint portion 42, is slightly bent outside, and extends so that the bent end is turned back inside and returned to the vicinity of the fixed end 41*a* (see FIG. 3D). The turnback portion of the spring piece 41 is a free end 41*b*. A bent portion 41*c* is provided in the portion that is turned back from the free end 41*b* and extends to the vicinity of the fixed end 41*a*, and a V-shape projecting inside is formed by the bent portion 41*c* in the portion extending to the vicinity of the fixed end 41*a*. It should be noted that a front end 41*d* of the spring piece 41 is slightly bent inside.

The base portion 50 is cylindrical and one end side thereof is provided with projecting portions 51 recessed toward the inner peripheral side and projecting from the inner peripheral surface. The two projecting portions 51 are provided in each of four positions arranged at intervals of 90 degrees on the inner peripheral surface and the spacing between the two projecting portions 51 arranged along the central line of the base portion 50 matches the width along the central line of the joint portion 42 of the spring component 40.

The spring components 40 are mounted to the base portion 50 as illustrated in FIG. 4 by inserting the joint portion 42 into the base portion 50 from one end side on which the projecting portions 51 of the base portion 50 are formed and fitting the joint portion 42 between the two projecting portions 51 arranged along the central line of the base portion 50 in the four positions.

The sleeve 60 has a cylindrical shape that is one size larger than the base portion 50. The socket contact 30 illustrated in FIGS. 3A to 3D is formed by mounting the sleeve 60 onto the base portion 50. The central line of the sleeve 60 matches the central line of the base portion 50. Accordingly, the four spring pieces 41 are arranged in rotational symmetry with respect to the central line of the sleeve 60 as a symmetric axis.

In this socket contact 30, the sleeve 60 is movable with respect to the base portion 50. When the sleeve 60 is moved, the sleeve 60 covers the free ends 41*b* of the four spring pieces 41 and elastically deforms the four spring pieces 41 so that the free ends 41*b* come close to each other. That is, coverage with the sleeve 60 reduces the dimension of the inner diameter surrounded by the free ends 41*b* of the four spring pieces 41. It should be noted that FIGS. 3A to 3D illustrate the state in which the sleeve 60 does not cover the free ends 41*b* of the spring pieces 41.

The material of the spring component 40 may be, for example, a phosphor bronze plate and the material of the base portion 50 and the sleeve 60 may be, for example, stainless steel. Regarding the spring component 40, the joint portion 42 may be fixed to the base portion 50 by welding after the joint portion 42 is fitted between the projecting portions 51 of the base portion 50.

As illustrated in FIG. 3D, the dimension of the inner diameter surrounded by the free ends 41*b* of the four spring pieces 41 is assumed to be d1 and the dimension of the inner diameter surrounded by the bent portions 41*c* located among the free ends 41*b* and the fixed ends 41*a* of the four spring pieces 41 is assumed to be d2.

Figure 6B:
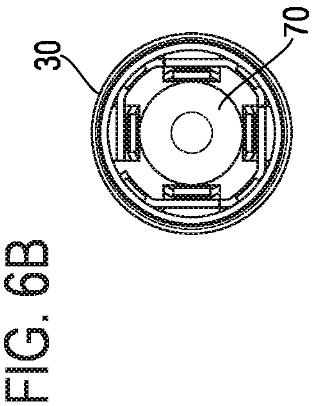
FIG. 6B is a rear view illustrating the state in which the pin contact is being connected to the socket contact in FIGS. 3A to 3D.
Figure 6C:
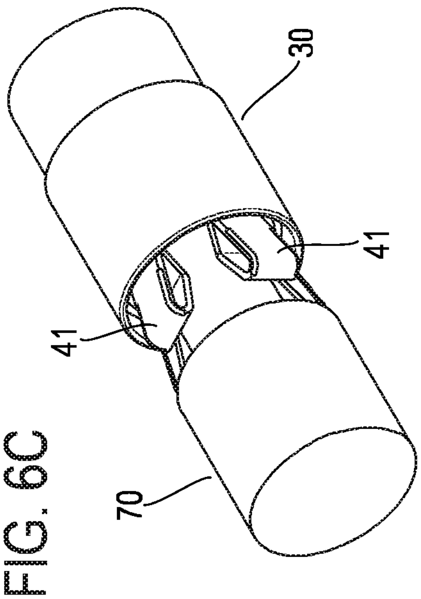
FIG. 6C is a perspective view illustrating the state in which the pin contact is being connected to the socket contact in FIGS. 3A to 3D.
Figure 6A:
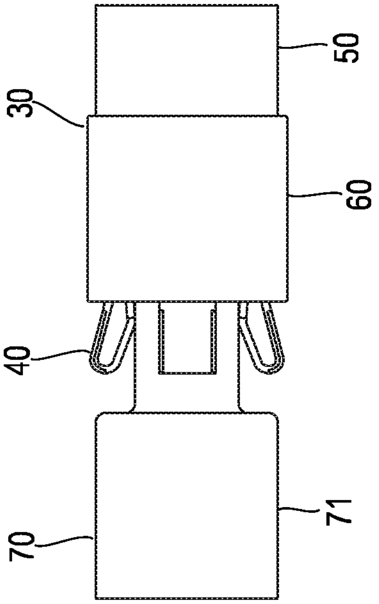
FIG. 6A is a side view illustrating the state in which a pin contact is being connected to the socket contact in FIGS. 3A to 3D.
Figure 6D:
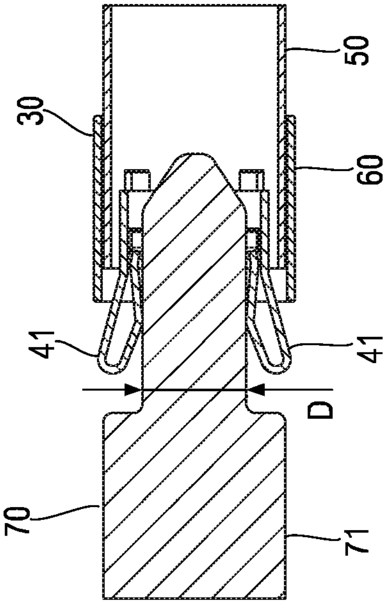
FIG. 6D is a sectional view illustrating the state in which the pin contact is being connected to the socket contact in FIGS. 3A to 3D.
Figure 7B:
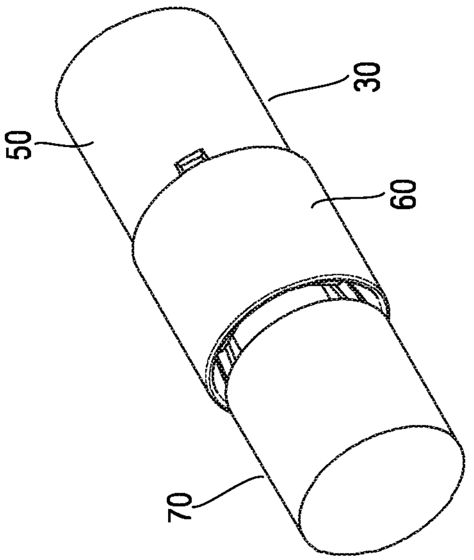
FIG. 7B is a perspective view illustrating the state in which the pin contact has been connected to the socket contact in FIGS. 3A to 3D.
Figure 7A:
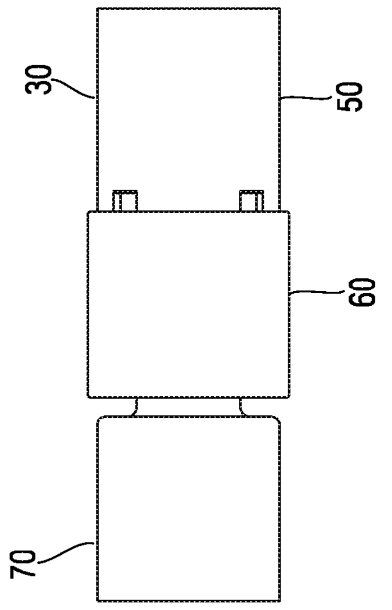
FIG. 7A is a side view illustrating the state in which the pin contact has been connected to the socket contact in FIGS. 3A to 3D.
Figure 7C:
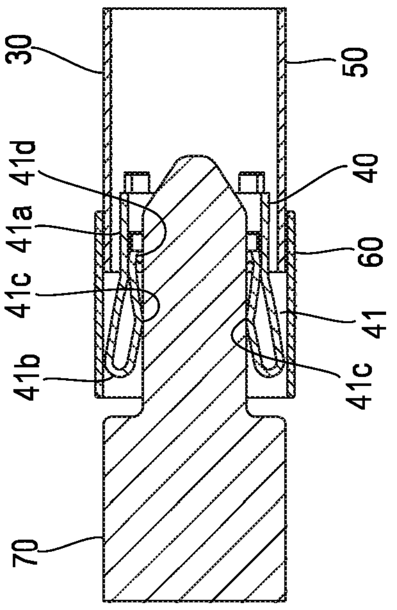
FIG. 7C is a sectional view illustrating the state in which the pin contact has been connected to the socket contact in FIGS. 3A to 3D.

FIGS. 6A to 6D illustrate the state in which a counterpart pin contact 70 is being connected to the socket contact 30 described above. FIG. 6A is a side view, FIG. 6B is a rear view, FIG. 6C is a perspective view, and FIG. 6D is a sectional view. FIGS. 7A to 7C illustrate the state in which the pin contact 70 has been connected to the socket contact 30. FIG. 7A is a side view, FIG. 7B is a perspective view, and FIG. 7C is a sectional view. The pin contact 70 is shaped like a cylinder having a tapered front end and the base end is provided with a block portion 71. Here, the outer dimension (dimension of the outer diameter) of the pin contact 70 is assumed to be D.

The dimension d1 of the inner diameter surrounded by the free ends 41*b* of the four spring pieces 41, the dimension d2 of the inner diameter surrounded by the bent portions 41*c*, and the outer dimension (dimension of the outer diameter) D of the pin contact 70 have the following relationship.

$$D<d2<d1$$

Accordingly, the pin contact 70 can be inserted among the four spring pieces 41 with no insertion force in this example. That is, the pin contact 70 can be inserted with zero insertion force (ZIF). Alternatively, d2 may be slightly less than D when D is set to be less than d1. Also in this case, the pin contact 70 can be inserted with a slight insertion force. That is, the pin contact 70 can be inserted with low insertion force (LIF).

FIGS. 6A to 6D illustrate the state in which the pin contact 70 has been inserted among the four spring pieces 41. When the sleeve 60 is moved toward a base end of the pin contact 70 from the state in FIGS. 6A to 6D and the pin contact 70 has been connected to the socket contact 30, the state in FIGS. 7A to 7C is reached. In FIGS. 7A to 7C, when the sleeve 60 covers the free ends 41*b* of the four spring pieces 41, the free ends 41*b* are displaced toward the pin contact 70. The displacement of the free ends 41*b* pushes the bent portions 41*c* against the pin contact 70, sandwiches and holds the pin contact 70 by the bent portions 41*c* of the four spring pieces 41, and makes an electric connection. It should be noted that the turned back front ends 41*d* of the spring pieces 41 make contact with the portions (portions of the fixed ends 41*a* side of the spring pieces 41) of the spring pieces 41 located outside, as illustrated in FIGS. 7A to 7C.

When the fixed ends 41*a*, the free ends 41*b*, and the bent portions 41*c* of the spring pieces 41 are assumed to be the fulcrums, the points of force, and the points of application of a lever, since the bent portions 41*c* are located between the free ends 41*b* and the fixed ends 41*a*, the bent portions 41*c* can be brought into contact with the pin contact 70 with a force larger than the force for displacing the free ends 41*b* based on the principle of a lever. Accordingly, a large contact force and a large retaining force can be obtained with a relatively small force for displacing the free ends 41*b*.

In addition, the front ends 41*d* of the spring pieces 41 make contact with the spring pieces 41 in this example, as described above. Accordingly, the bent portions 41*c* can hold the pin contact 70 using both of the force applied to the free ends 41*b* and the force applied to the front ends 41*d*. Accordingly, it is possible to obtain the socket contact 30 that has better connection reliability and better connection operability and can be connected to the pin contact 70 with a low operational force.

Figure 8:
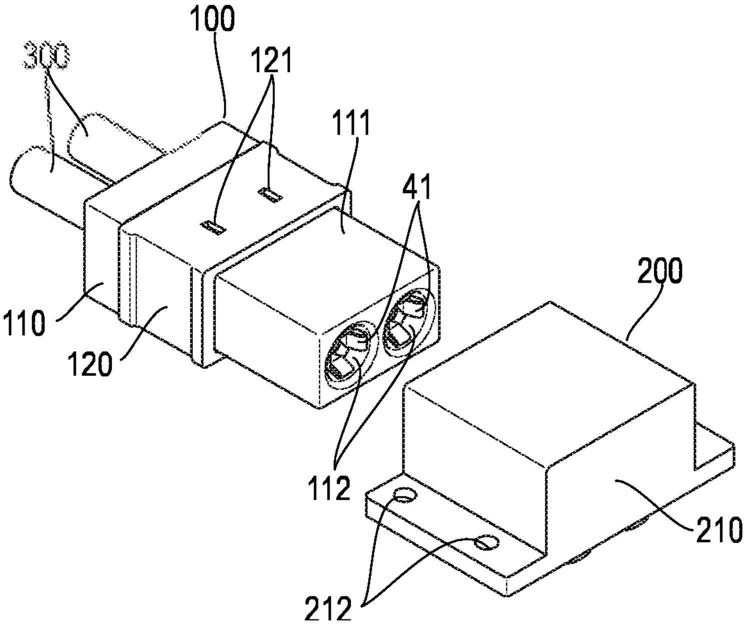
FIG. 8 is a perspective view illustrating a connector having the socket contact in FIGS. 3A to 3D and a counterpart connector having the pin contact.
Figure 9:
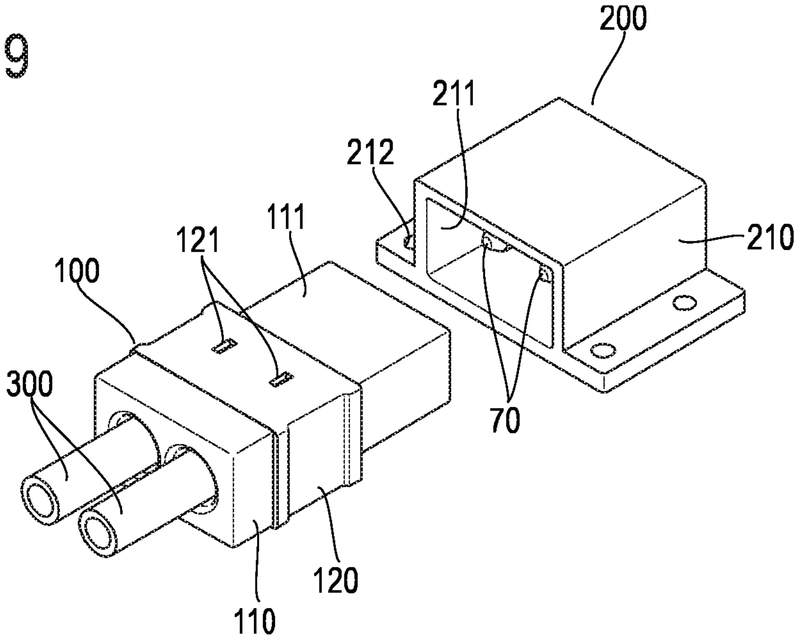
FIG. 9 is another perspective view illustrating the connector having the socket contact in FIGS. 3A to 3D and the counterpart connector having the pin contact.

FIG. 8 and FIG. 9 illustrate a two-contact connector 100 having two socket contacts 30 described above and a two-contact counterpart connector 200 having two pin contacts 70. The connector 100 includes the two socket contacts 30, a housing 110 which is made of resin and houses the socket contacts 30, and a slider 120 which is made of resin and is slidably mounted to the housing 110. The front end surface of a fitting portion 111 of the housing 110 is provided with two openings 112 and the spring pieces 41 of the socket contacts 30 are disposed in the openings 112. Reference numeral 300 in FIG. 8 and FIG. 9 represents cables connected to the socket contacts 30.

The counterpart connector 200 includes the two pin contacts 70 and a housing 210 which is made of resin and houses the pin contacts 70. The housing 210 is provided with a fitting hole 211 to which the fitting portion 111 of the connector 100 is fitted and the two pin contacts 70 are disposed in this fitting hole 211. In this example, the counterpart connector 200 also has screwing holes 212 used for screwing to the cabinet. Although not illustrated in detail, the pin contacts 70 may have a shape that allows crimp terminals crimped to cables to be screwed from the lower surface side of the housing 210.

Figure 10:
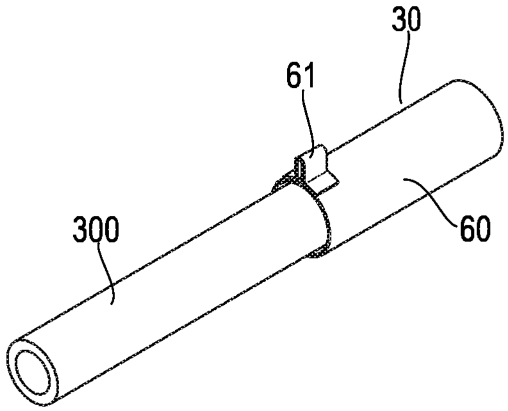
FIG. 10 is a perspective view illustrating the state of connection between a cable and the socket contact in FIG. 8.
Figure 11A:
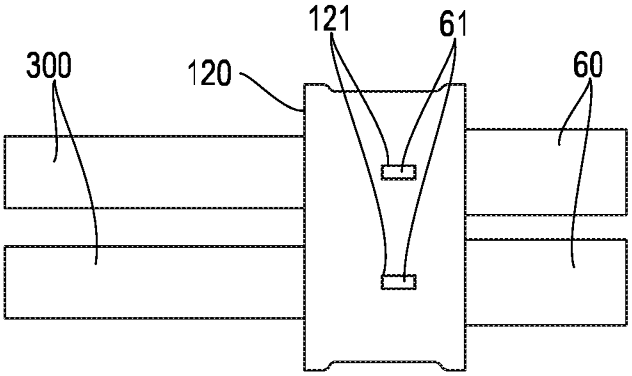
FIG. 11A is a plan view illustrating the state in which a housing has been removed from the connector having the socket contact in FIG. 8.
Figure 11B:
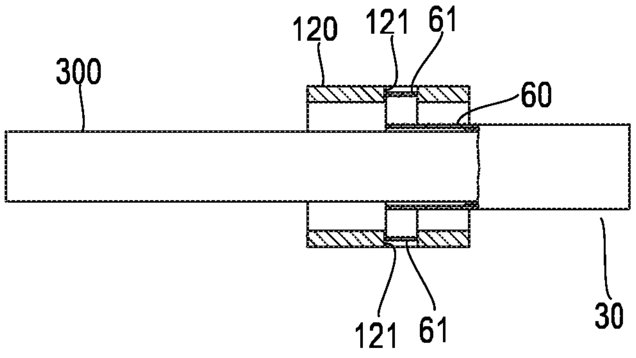
FIG. 11B is a sectional view illustrating the state in which the housing has been removed from the connector having the socket contact in FIG. 8.

In the connector 100, the sleeves 60 of the two socket contacts 30 may be moved in conjunction with the sliding movement of the slider 120. The sleeves 60 of the socket contacts 30 are provided with projections 61 as illustrated in FIG. 10 and the slider 120 is provided with holes 121 into which the projections 61 are inserted. FIGS. 11A and 11B illustrate the state in which the projections 61 provided on the sleeves 60 have been inserted into the holes 121 of the slider 120. In such a structure, the sleeves 60 are moved in conjunction with the sliding movement of the slider 120. Accordingly, the spring pieces 41 can be elastically deformed by pressing the free ends 41*b* via the sliding movement of the slider 120. The slider 120 is provided with the two holes 121 corresponding to the two socket contacts 30. The housing 110 is provided with slits (not illustrated in FIG. 8 and FIG. 9 because they are hidden by the slider 120) that enable the projections 61 to be engaged with the slider 120 and the projection 61 to be moved. It should be noted that the projections 61 may be made of metal and may be mounted to the sleeves 60 by, for example, welding.

Figure 12:
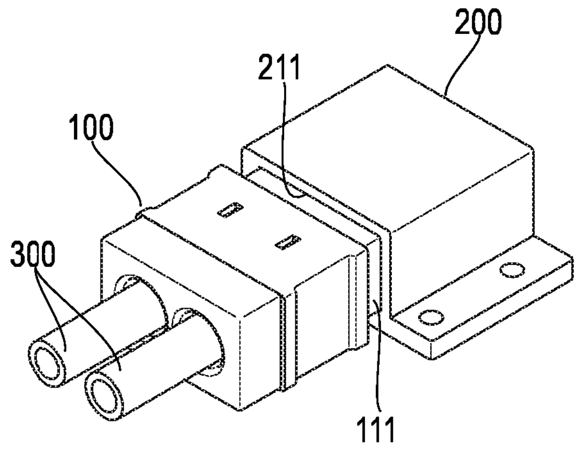
FIG. 12 is a perspective view illustrating the state in which the connector in FIG. 9 is being connected to the counterpart connector in FIG. 9.
Figure 13:
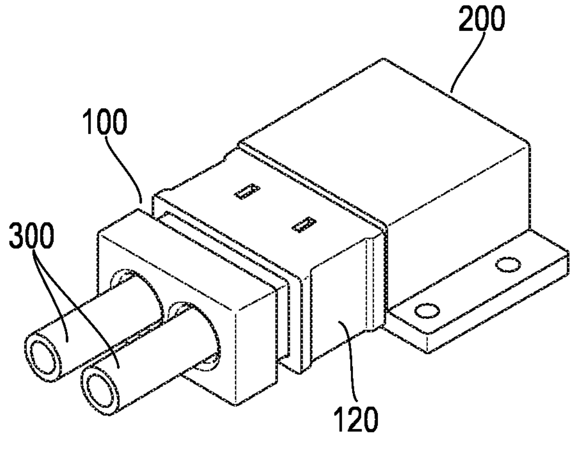
FIG. 13 is a perspective view illustrating the state in which the connector in FIG. 9 has been connected to the counterpart connector in FIG. 9.

FIG. 12 is a perspective view illustrating the state in which the fitting portion 111 of the connector 100 is being fitted and connected to the fitting hole 211 of the counterpart connector 200. FIG. 13 is a perspective view illustrating the state in which the connector 100 has been connected to the counterpart connector 200 by sliding the slider 120 toward the counterpart connector 200.

When, for example, the connector having the socket contact 30 is a one-contact connector, the sleeve 60 may be moved by directly operating the projection 61 provided on the sleeve 60 as illustrated in FIG. 10 without providing the slider 120.

Second Embodiment

Figure 14B:
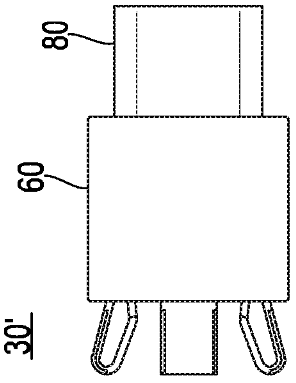
FIG. 14B is a side view illustrating the socket contact according to the second embodiment.
Figure 14D:
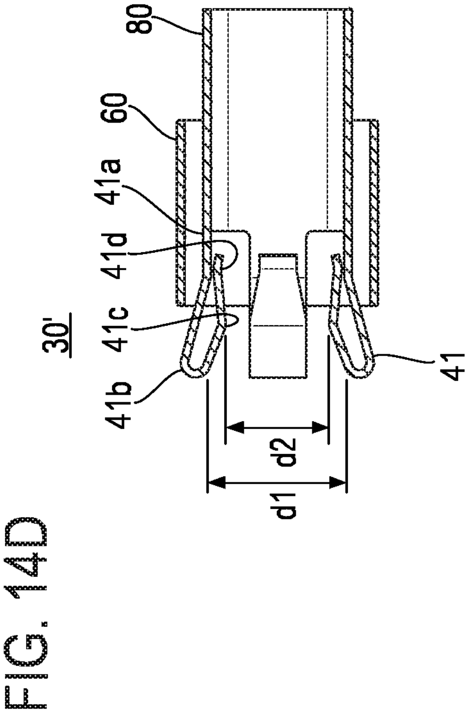
FIG. 14D is a sectional view illustrating the socket contact according to the second embodiment.
Figure 14A:
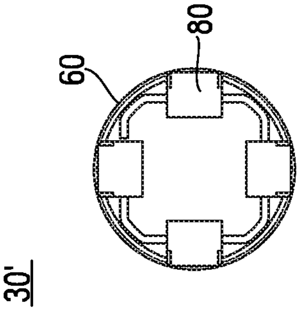
FIG. 14A is a front view illustrating a socket contact according to a second embodiment.
Figure 14C:
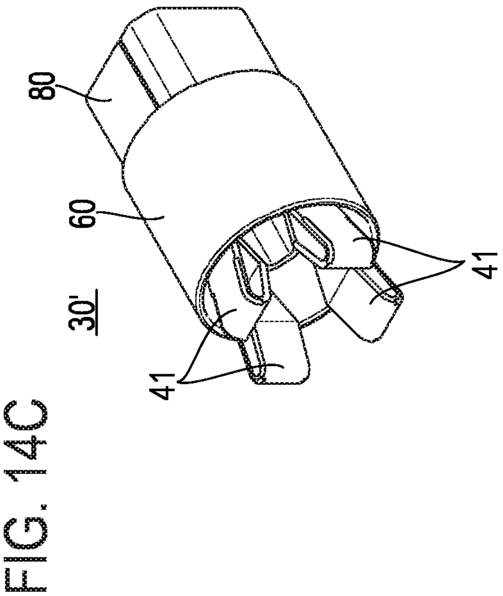
FIG. 14C is a perspective view illustrating the socket contact according to the second embodiment.

FIGS. 14A to 14D illustrate a socket contact according to a second embodiment. FIG. 14A is a front view, FIG. 14B is a side view, FIG. 14C is a perspective view, and FIG. 14D is a sectional view. Components corresponding to those in the first embodiment are denoted by the same reference characters and detailed descriptions thereof are omitted.

The socket contact in the second embodiment has a contact component 80 obtained by integrally forming the spring component 40 and the base portion 50 in the first embodiment. That is, a socket contact 30' includes the contact component 80 and the sleeve 60.

Figure 15A:
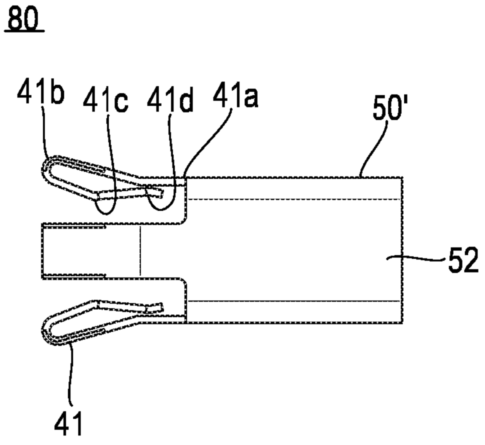
FIG. 15A is a side view illustrating a contact component of the socket contact in FIGS. 14A to 14D.
Figure 15B:
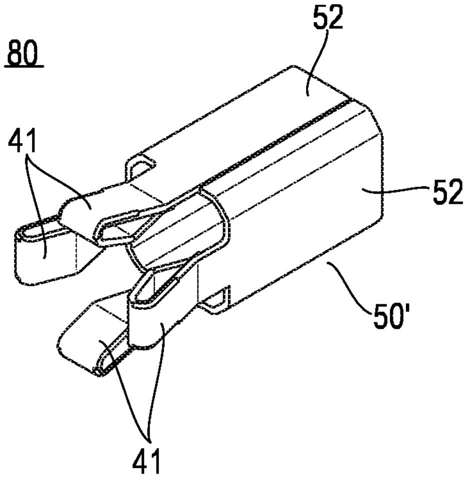
FIG. 15B is a perspective view illustrating the contact component of the socket contact in FIGS. 14A to 14D.

The contact component 80 may have a shape as illustrated in FIGS. 15A and 15B. In this example, the contact component 80 has the shape in which the four spring pieces 41 are extended from four side surface portions 52 of a base portion 50' that is a quadratic prism having a substantially rectangular cross section. The spring pieces 41 may have the same shape as the spring pieces 41 in the first embodiment. The sleeve 60 is mounted onto the base portion 50' so as to movable with respect to the base portion 50'. The spring pieces 41 are arranged in rotational symmetry with respect to the central line of the sleeve 60 as a symmetric axis, as in the first embodiment. In this example, the spring pieces 41 are arranged in fourfold symmetry positions on the circumference at regular angular intervals of 90 degrees. The material of the contact component 80 may be, for example, a phosphor bronze plate and the contact component 80 may be formed by bending the phosphor bronze plate.

Figure 16A:
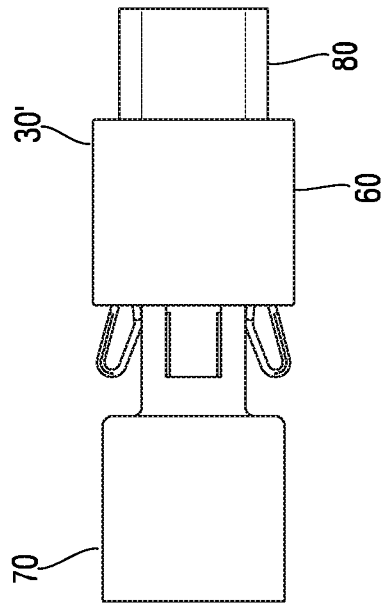
FIG. 16A is a side view illustrating the state in which the pin contact is being connected to the socket contact in FIGS. 14A to 14D.
Figure 16B:
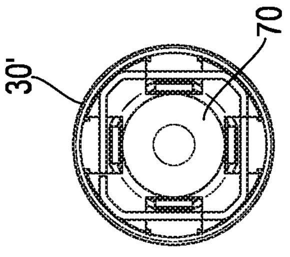
FIG. 16B is a rear view illustrating the state in which the pin contact is being connected to the socket contact in FIGS. 14A to 14D.
Figure 16C:
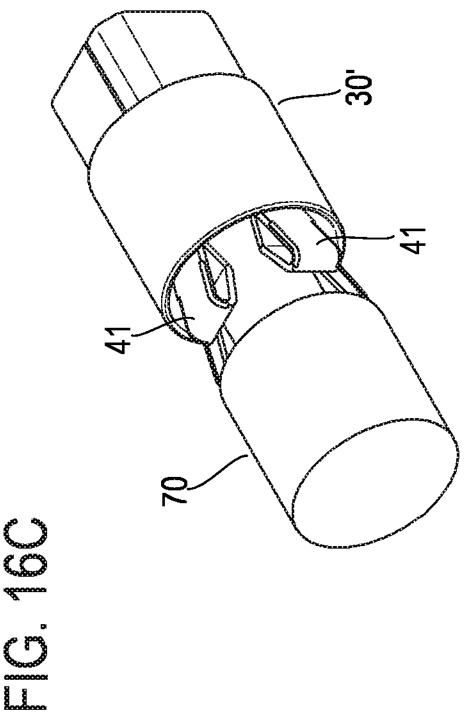
FIG. 16C is a perspective view illustrating the state in which the pin contact is being connected to the socket contact in FIGS. 14A to 14D.
Figure 16D:
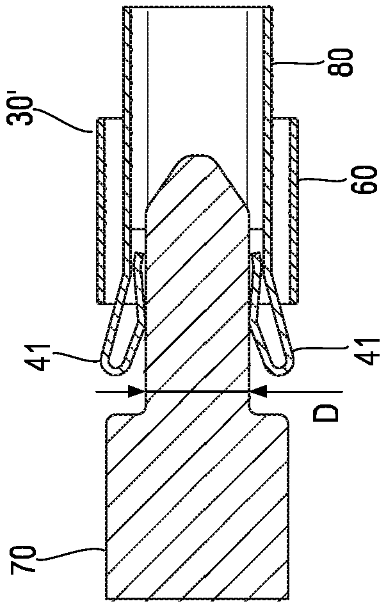
FIG. 16D is a sectional view illustrating the state in which the pin contact is being connected to the socket contact in FIGS. 14A to 14D.
Figure 17B:
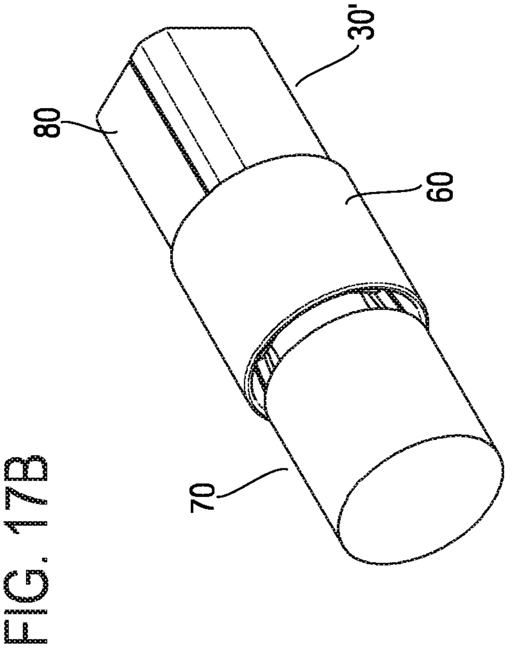
FIG. 17B is a perspective view illustrating the state in which the pin contact has been connected to the socket contact in FIGS. 14A to 14D.
Figure 17A:
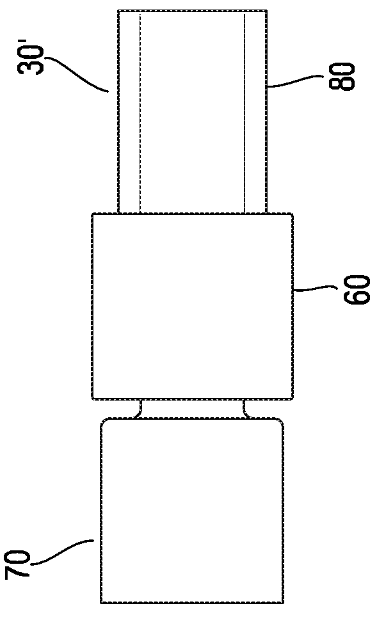
FIG. 17A is a side view illustrating the state in which the pin contact has been connected to the socket contact in FIGS. 14A to 14D.
Figure 17C:
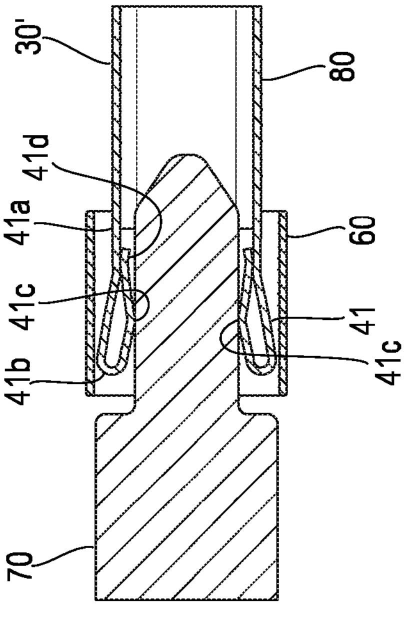
FIG. 17C is a sectional view illustrating the state in which the pin contact has been connected to the socket contact in FIGS. 14A to 14D.

FIGS. 16A to 16D and FIGS. 17A to 17C correspond to FIGS. 6A to 6D and FIGS. 7A to 7C in the first embodiment. FIGS. 16A to 16D illustrate the state in which the counterpart pin contact 70 is being connected to the socket contact 30'. FIG. 16A is a side view, FIG. 16B is a rear view, FIG. 16C is a perspective view, and FIG. 16D is a sectional view. FIGS. 17A to 17C illustrate the state in which the pin contact 70 has been connected to the socket contact 30'. FIG. 17A is a side view, FIG. 17B is a perspective view, and FIG. 17C is a sectional view. Since this socket contact 30' also has the four spring pieces 41 and the sleeve 60 as the socket contact 30 according to the first embodiment, the connection reliability and connection operability have good characteristics.

It should be noted that the shape of the sleeve 60 is not limited to a cylinder and may be a hollow column having a polygonal cross section. In addition, the outer shape of the sleeve 60 may be asymmetric. In addition, although the socket contacts 30 and 30' in the first embodiment and the second embodiment have the four spring pieces 41, the number of spring pieces 41 is not limited to four. For example, the two spring pieces 41 may be arranged in twofold symmetry positions or the three spring pieces 41 may be arranged in threefold symmetry positions with respect to the central line of the sleeve 60 as a symmetric axis. The outer shape of the pin contact 70 is not limited to a cylinder and may be a column having a polygonal cross section.

Third Embodiment

Figure 18:
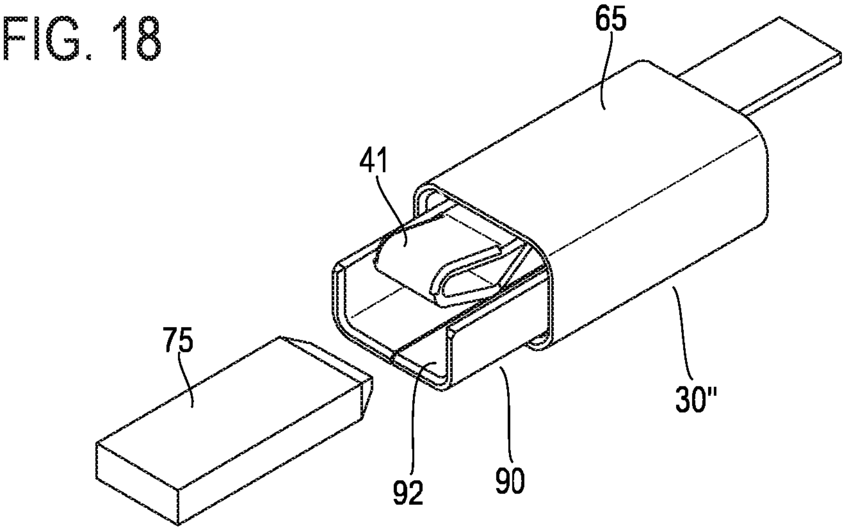
FIG. 18 is a perspective view illustrating a socket contact according to a third embodiment together with a pin contact.

FIG. 18 illustrates the socket contact according to a third embodiment together with a counterpart pin contact. A pin contact 75 is planar in this example. A socket contact 30" is connected to the pin contact 75.

Figure 19:
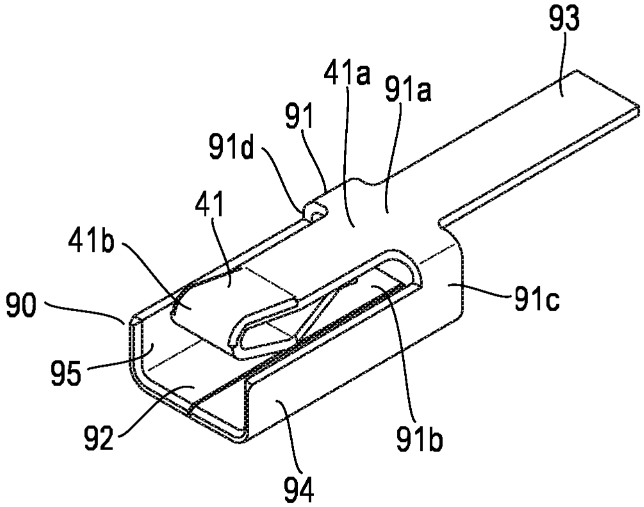
FIG. 19 is a perspective view illustrating a contact component.

The socket contact 30" has a contact component 90 and a sleeve 65. FIG. 19 is a perspective view illustrating the contact component 90. The contact component 90 has one spring piece 41 similar to the spring piece 41 in the first embodiment. The contact component 90 includes the cantilever-shaped spring piece 41, a base portion 91 to which the fixed end 41*a* of the spring piece 41 is fixed, and an opposed portion 92 extended from the base portion 91. The opposed portion 92 is opposed to the spring piece 41.

The base portion 91 is shaped like a flat column with a substantially rectangular cross section and the spring piece 41 is extended from an upper surface portion 91*a* thereof. It should be noted that an extension piece 93 is extended from the upper surface portion 91*a* on the side of the upper surface portion 91*a* opposite to the spring piece 41. The opposed portion 92 is extended from a lower surface portion 91*b* of the base portion 91. Side wall portions 94 and 95 are provided on both sides in the width direction of the opposed portion 92. The side wall portions 94 and 95 are formed by extending side surface portions 91*c* and 91*d* of the base portion 91.

The sleeve 65 is shaped like a flat column with a substantially rectangular cross section one size larger than in the base portion 91. The sleeve 65 is mounted to the outside of the base portion 91 so as to be movable with respect to the base portion 91. The sleeve 65 elastically deforms the spring piece 41 when the sleeve 65 moves and covers the free end 41*b* of the spring piece 41, as the sleeve 60 in the first embodiment. At this time, the spring piece 41 is elastically deformed so that the free end 41*b* comes close to the opposed portion 92. The material of the contact component 90 may be, for example, a phosphor bronze plate and the contact component 90 may be formed by bending the phosphor bronze plate. The material of the sleeve 65 may be, for example, stainless steel.

Figure 20A:
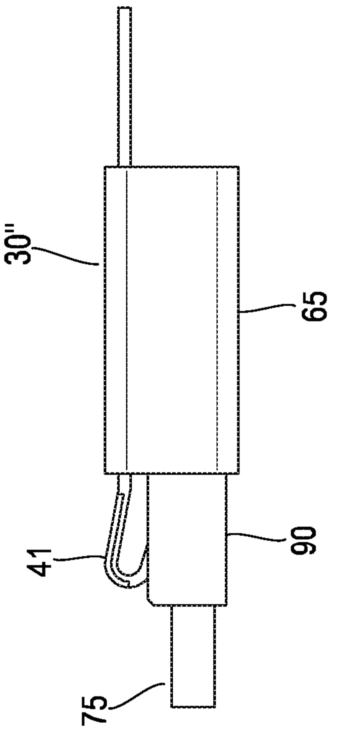
FIG. 20A is a side view illustrating the state in which the socket contact in FIG. 18 is being connected to the pin contact in FIG. 18.
Figure 20B:
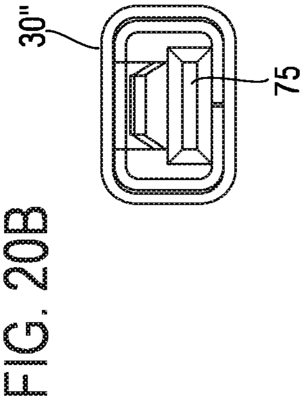
FIG. 20B is a rear view illustrating the state in which the socket contact in FIG. 18 is being connected to the pin contact in FIG. 18.
Figure 20C:
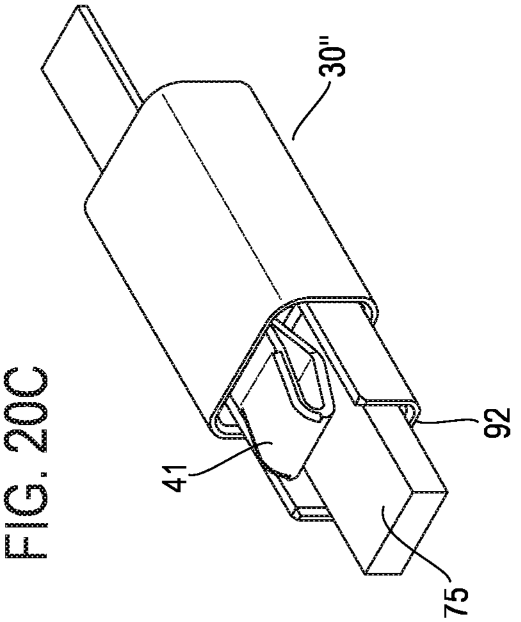
FIG. 20C is a perspective view illustrating the state in which the socket contact in FIG. 18 is being connected to the pin contact in FIG. 18.
Figure 20D:
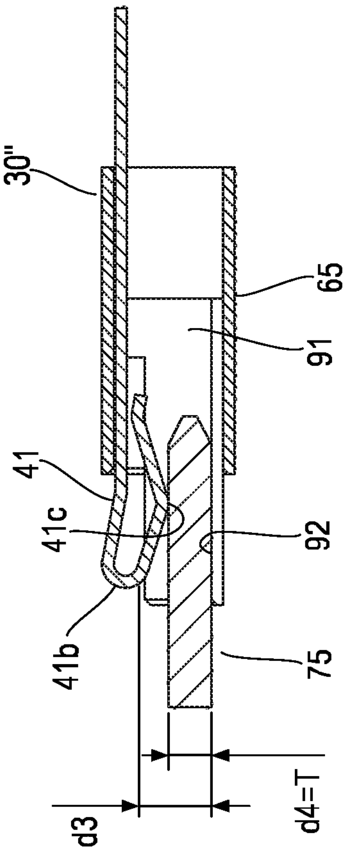
FIG. 20D is a sectional view illustrating the state in which the socket contact in FIG. 18 is being connected to the pin contact in FIG. 18.
Figure 21B:
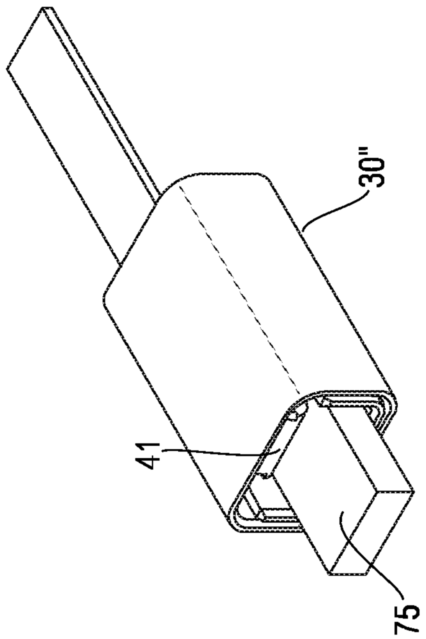
FIG. 21B is a perspective view illustrating the state in which the socket contact in FIG. 18 has been connected to the pin contact in FIG. 18.
Figure 21A:
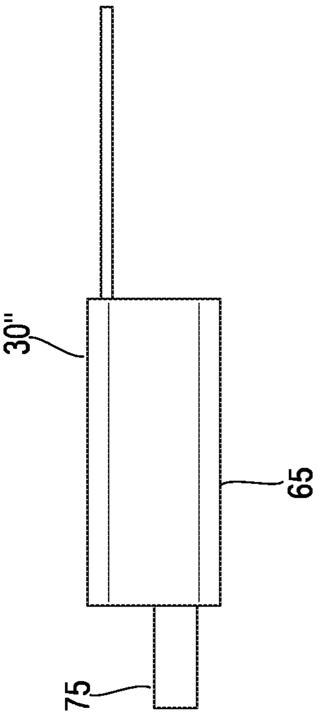
FIG. 21A is a side view illustrating the state in which the socket contact in FIG. 18 has been connected to the pin contact in FIG. 18.
Figure 21C:
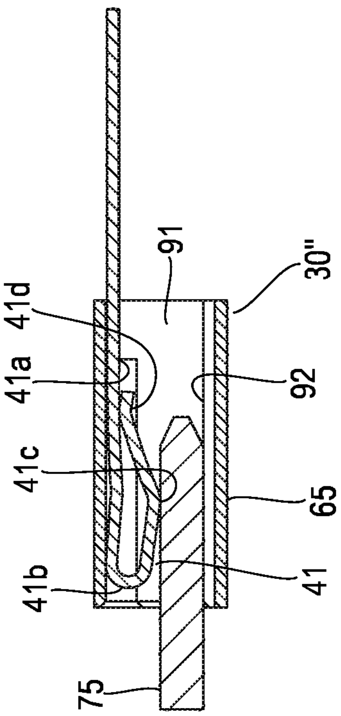
FIG. 21C is a sectional view illustrating the state in which the socket contact in FIG. 18 has been connected to the pin contact in FIG. 18.

FIGS. 20A to 20D and FIGS. 21A to 21C correspond to FIGS. 6A to 6D and FIGS. 7A to 7C in the first embodiment. FIGS. 20A to 20D illustrate the state in which the counterpart pin contact 75 is being connected to the socket contact 30". FIG. 20A is a side view, FIG. 20B is a rear view, FIG. 20C is a perspective view, and FIG. 20D is a sectional view. FIGS. 21A to 21C illustrate the state in which the pin contact 75 has been connected to the socket contact 30". FIG. 21A is a side view, FIG. 21B is a perspective view, and FIG. 21C is a sectional view. In the socket contact 30", the spacing between the free end 41*b* of the spring piece 41 and the opposed portion 92 is assumed to be d3, the spacing between the opposed portion 92 and the bent portion 41*c* located between the free end 41*b* and the fixed end 41*a* of the spring piece 41 is assumed to be d4, and the outer dimension of the pin contact 75 inserted into the spacings d3 and d4 is assumed to be T. When the following relationship is met among d3, d4, and T, the pin contact 75 can also be inserted without an insertion force in the third embodiment.

$$T<d4<d3$$

Alternatively, d4 may be equal to or slightly less than T when T is set to be less than d3. It should be noted that T, d3, and d4 are indicated in FIG. 20D by assuming that T is equal to d4.

When the sleeve 65 is moved, the spring piece 41 is elastically deformed and the free end 41*b* comes close to the opposed portion 92. The pin contact 75 inserted between the spring piece 41 and the opposed portion 92 is sandwiched and held by the bent portion 41*c* of the elastically deformed spring piece 41 and the opposed portion 92 as illustrated in FIG. 21C and electrically connected.

Since the spring piece 41 in the socket contact 30" also functions as the spring piece 41 in the first embodiment, the connection reliability and connection operability have good characteristics.

Although the spring piece of the socket contact suitably has a shape that is turned back inside from the free end 41*b* so that the front end 41*d* is returned to the fixed end 41*a* as described above, the shape of the spring piece 41 is not limited to this. A shape other than this may have a certain level of effects. For example, the spring piece may have a shape in which a turnback is not present at the free end, the free end is the front end, and the bent portion in contact with the pin contact is provided between the free end and the fixed end. In this case, a V-shape projecting toward the pin contact by the bent portion may be formed by the whole spring piece 41.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A socket contact to be connected to a counterpart pin contact, the socket contact comprising:
- a cantilever-shaped spring piece;
- a base portion to which a fixed end of the spring piece is fixed;
- a planar opposed portion extended from the base portion and opposed to the spring piece; and
- a sleeve movably mounted to the base portion, wherein
  - the pin contact is insertable along and engages a face of the opposed portion,
  - the spring piece has a turnback portion turned back inside from a free end,
  - the turnback portion is provided with a bent portion between the free end and the fixed end,
  - the spring piece further has a back portion obliquely extending to and behind the bent portion such that the free end is away from the opposed portion,
  - the spring piece is elastically deformed so that the free end comes close to the opposed portion when the sleeve is moved and covers an upper surface of the free end,
  - the pin contact is inserted between the spring piece and the opposed portion when the sleeve does not cover the back portion, the inserted pin contact is sandwiched by the bent portion of the spring piece elastically deformed by the movement of the sleeve for covering the upper surface of the free end of the spring piece and the opposed portion, electrically connected, and held.

2. The socket contact according to claim 1, wherein
- a spacing between the bent portion and the opposed portion is larger than an outer dimension of the pin contact to be inserted into the spacing.

3. A connector comprising:
- a socket contact to be connected to a counterpart pin contact; and
- a housing that holds the socket contact, wherein
  - the socket contact includes
    - a cantilever-shaped spring piece,
    - a base portion to which a fixed end of the spring piece is fixed,
    - a planar opposed portion extended from the base portion and opposed to the spring piece, and
    - a sleeve movably mounted to the base portion,
  - the pin contact is insertable along and engages a face of the opposed portion,
  - the spring piece has a turnback portion turned back inside from a free end,
  - the turnback portion is provided with a bent portion between the free end and the fixed end,
  - the spring piece further has a back portion obliquely extending to and behind the bent portion such that the free end is away from the opposed portion the spring piece is elastically deformed so that the free end comes close to the opposed portion when the sleeve is moved and covers an upper surface of the free end, and the pin contact is inserted between the spring piece and the opposed portion when the sleeve does not cover the back portion, the inserted pin contact is sandwiched by the bent portion of the spring piece elastically deformed by the movement of the sleeve for covering the upper surface of the free end of the spring piece and the opposed portion, electrically connected, and held, and the housing is provided with a slider that moves in conjunction with the sleeve.

4. The connector according to claim 3, wherein a spacing between the bent portion and the opposed portion is larger than an outer dimension of the pin contact to be inserted into the spacing.

* * * * *